United States Patent
Schimpl et al.

(10) Patent No.: US 8,493,733 B2
(45) Date of Patent: Jul. 23, 2013

(54) MOBILE MEASUREMENT DEVICE

(75) Inventors: Thomas Schimpl, Leibnitz (AT);
Martin Dorfner, Gleisdorf (AT); Volker Pointner, Graz (AT)

(73) Assignee: AVL List GmbH, Graz (AT)

( * ) Notice: Subject to any disclaimer, the term of this patent is extended or adjusted under 35 U.S.C. 154(b) by 234 days.

(21) Appl. No.: 13/067,704

(22) Filed: Jun. 21, 2011

(65) Prior Publication Data
US 2011/0317361 A1    Dec. 29, 2011

(30) Foreign Application Priority Data
Jun. 21, 2010    (AT) .................. GM388/2010

(51) Int. Cl.
*H05K 7/20*    (2006.01)
(52) U.S. Cl.
USPC ...... 361/695; 165/104.33; 165/122; 454/184; 324/750.01; 324/750.03; 324/750.14; 374/50; 374/121; 374/125; 374/165
(58) Field of Classification Search
USPC ....... 361/679.46–679.53, 690–695, 715–727; 165/80.3, 104.33, 121–126, 185; 312/223.2, 312/223.3, 236; 454/184; 62/259.2; 324/750.01, 324/750.03, 750.04, 750.14, 750.28; 374/30, 374/50, 121, 125, 132, 145, 163–165
See application file for complete search history.

(56) References Cited

U.S. PATENT DOCUMENTS

| | | | | |
|---|---|---|---|---|
| 5,359,285 A * | 10/1994 | Hashinaga et al. | ...... | 324/750.07 |
| 5,535,814 A * | 7/1996 | Hartman | ...... | 165/217 |
| 5,907,473 A * | 5/1999 | Przilas et al. | ...... | 361/699 |
| 5,947,189 A * | 9/1999 | Takeuchi et al. | ...... | 165/51 |
| 6,145,750 A * | 11/2000 | Carpenter | ...... | 236/44 A |
| 7,686,507 B2 * | 3/2010 | Emery et al. | ...... | 374/166 |
| 8,197,124 B2 * | 6/2012 | Claassen et al. | ...... | 374/29 |

* cited by examiner

*Primary Examiner* — Michail V Datskovskiy
(74) *Attorney, Agent, or Firm* — Dykema Gossett PLLC

(57) ABSTRACT

A mobile measurement device, particularly for temporary use in or on vehicles, on stationary engines, or on test benches, consists of individual components (2) that might have different working temperatures, disposed in a common housing (1). Furthermore, at least one fan (6) is provided. In order to allow a very broad range of use with regard to the outside temperature range, at the smallest and lightest possible construction, in order to guarantee simple transport and great mobility, and reliable measurements within this range, the housing (1) is structured essentially in gastight manner. Furthermore, compartments for the individual components (2) that are separated from one another by means of air baffles (3) and a conditioning drawer (4) that extends over an entire housing side are provided, which conditioning drawer (4) is provided with the single air inlet (5) and in which at least one fan (6), preferably having a variable throughput, at least one conditioning block (7), and at least one temperature sensor (8) are disposed. Outlets (9) having defined cross-sections lead from the conditioning drawer (4) to at least some compartments for the individual components (2), and the conditioning block (7), the fan (6), and the temperature sensor (8) are connected with a control system integrated into the measurement device, which system controls the conditioning block (7) and the fan (6) in accordance with the desired working temperature of the individual components (2).

10 Claims, 2 Drawing Sheets

MOBILE MEASUREMENT DEVICE

BACKGROUND OF THE INVENTION

1. Field of the Invention

The invention relates to a mobile measurement device, particularly for use in vehicles or on test benches, having individual components that might have different working temperatures, disposed in a common housing, as well as having at least one fan.

2. The Prior Art

In conventional measurement devices, the range of use is very restricted with regard to the ambient temperature, and lies between +5 and max. 45° C.

The task of the present invention was a measurement construction or measurement device that has a very broad range of use with regard to the outside temperature range, while having the smallest and lightest possible construction, in order to guarantee simple transport and great mobility, and that allows reliable measurements within this range.

SUMMARY OF THE INVENTION

To accomplish this task, the measurement device is characterized, according to the invention, in that the housing is structured essentially in gastight manner, has compartments for the individual components that are separated from one another by means of air baffles, and has a conditioning drawer that extends over an entire housing side, which conditioning drawer is provided with the single air inlet and in which at least one fan, preferably having a variable, adjustable throughput, at least one conditioning block, and at least one temperature sensor are disposed, where outlets having a manually adjustable cross-section lead from the conditioning drawer to at least some compartments for the individual components, and where the conditioning block, the fan, and the temperature sensor are connected with a control system integrated into the measurement device, which system controls the conditioning block and the fan in accordance with the desired working temperature of the individual components. In this way, even cold tests are possible within the scope of vehicle tuning, without impairing the reliability of the measurements. The measurement device can already be prepared for the intended use temperature range during the setup phase, by way of the air inlet and air outlet cross-sections, which are preferably adjustable manually.

According to an advantageous embodiment of the invention, a single air outlet out of the housing is provided.

Preferably, in this connection, the air outlet is provided with a fan having a variable throughput, which fan is connected with the control system integrated into the measurement device, and is controlled in accordance with the desired working temperature of the individual components or of the measurement device.

If, according to another embodiment of the measurement construction and/or of the measurement device according to the invention, the cross-section of air inlet and/or air outlet is adjustable by way of the control system, preferably manually or also automatically, the intended use temperature range can be taken into consideration even more precisely.

In order to be able to take the optimal temperature range of individual components present in the measurement device into consideration even better, another advantageous embodiment of the invention provides that at least some of the individual components are provided with a temperature sensor that is connected with the control system integrated into the measurement device, and that a fan is used in an outlet from the conditioning drawer to the compartment of the individual component, which fan is connected with the control system integrated into the measurement device and is controlled in accordance with the desired working temperature of the individual components.

According to another optional characteristic of the invention, it is provided that at least some of the individual components are provided with a temperature sensor that is connected with the control system integrated into the measurement device, and that the individual components are provided with an additional conditioning block that is also connected with the control system integrated into the measurement device and is controlled in accordance with the desired working temperature of the individual components or of the measurement device.

If the air inlet is designed for connecting a line for conditioned air, an external source for conditioned air, preferably from the air conditioning system of the vehicle, can be connected and used for conditioning of the measurement device.

In order to prevent damage to individual temperature-sensitive components and to minimize measurement errors, a sequence can furthermore be implemented in the control system, according to which sequence a minimum and/or maximum temperature that can be predetermined is monitored for at least one of the individual components, and this component is only turned on or off, respectively, when the minimum temperature is reached and/or exceeded or the maximum temperature is not exceeded, respectively.

Alternatively to this, it could also be provided that a sequence is integrated into the control system, according to which sequence only the conditioning unit and the at least one fan in the conditioning drawer can be put into operation until a minimum temperature is reached or exceeded or after the maximum temperature is exceeded.

A variant of the invention according to which a sequence for temperature-critical components is integrated into the control system, according to which sequence temperature changes are damped by means of sliding or stepped raising or lowering of the fan throughputs, is also particularly advantageous.

In the following description, the invention will be explained in greater detail using preferred exemplary embodiments.

DETAILED DESCRIPTION OF THE PREFERRED EMBODIMENTS

Figure 1:
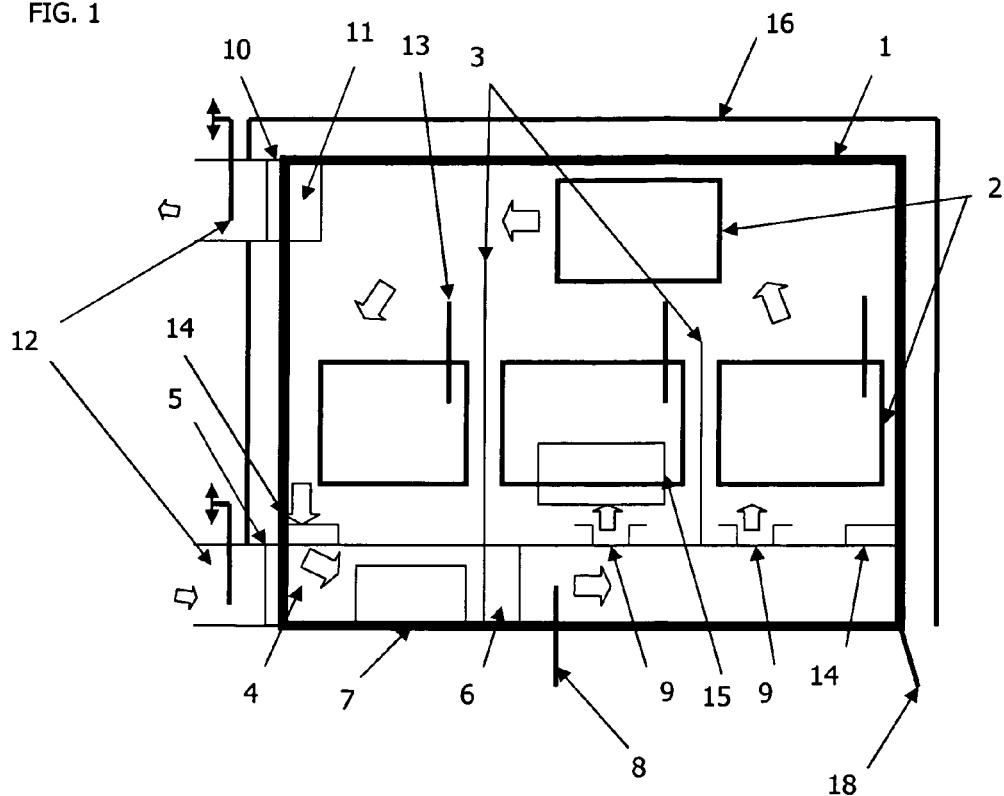
FIG. 1 shows a first embodiment of a measurement device according to the invention, in a schematic representation, in a configuration for very low ambient temperatures.

The measurement device according to the invention, according to FIG. 1, has multiple individual components 2, which typically have different working temperatures, in a housing 1 that is essentially configured in gastight manner. The individual components 2 are preferably disposed in compartments separated from one another by means of air baffles 3, thereby facilitating individual cooling or heating.

A conditioning drawer 4 that extends over the entire bottom surface area is provided, preferably as the bottom of the measurement device, and is equipped with the only air inlet 5 in the housing 1. Furthermore, at least one fan 6 having a variable throughput is disposed in the conditioning drawer, which fan ensures circulation of the by means of at least one conditioning block 7 also disposed in the conditioning drawer 4. Depending on the purpose of use and the ambient temperature, the conditioning block 7 can contain a heating and/or cooling device or can be structured as such a device. Control of the conditioning block 7 takes place by way of a control system integrated into the measurement device, with which at least one temperature sensor 8 provided in the conditioning drawer is also connected.

Proceeding from the conditioning drawer 4, outlets 9 for the circulated and/or conditioned air lead to the individual components 2 or into the compartments defined by the air baffles 3. In order to be able to coordinate the air feed to the individual components 2 as a function of the expected ambient temperature relative to their working temperature, the outlets 9 are structured to have an adjustable cross-section. The placement and the cross-sections of these outlets are defined over the course of development. The placement and the cross-sections of the outlets 9 are determined once for all provided individual components 2 having a specific cooling air demand. If other, new or alternative components having a different cooling air demand are supposed to be integrated, then these outlets 9 must be redefined. Fundamentally, these outlets 9 are then established for all the individual components 2 that can be used within a device, after completion of the development for a type of device. However, an embodiment of the outlets 9 could also be provided, whose cross-section can be automatically changed even during measurement operation, by means of the control system.

In addition to the outlets 9, other guide devices such as ducts or the like can also be provided for the conditioned air, particularly in regions of the housing 1 that lie farther away in the conditioning drawer 4, for example in a second or further plane of individual components 2.

To remove air and moisture out of the housing 1, a single air outlet 10 is provided, which is preferably provided with a fan 11 having a variable throughput. This fan 11, too, is connected with the control system integrated into the measurement device, and can therefore be controlled in accordance with the desired working temperature of the individual components 2 or of the measurement device as a whole. Independent of the fans 6 and 11, respectively, the cross-section of air inlet 5 and/or air outlet 10 can preferably be adjusted manually during the setup phase, but also automatically during measurement operation, by way of the control system. For this purpose, adjustable slides 12, for example, are provided. The adjustable slides 12 or also other devices for reducing the cross-section can also be disposed in an external sheath 16 or the external housing 16.

At least some of the individual components 2 can be provided with their own temperature sensors 13, which are advantageously also connected with the control system integrated into the measurement device, so that the optimal temperature ranges of the individual components 2 can be taken into consideration even better. This can be done, for example, in that another fan 14 is used in an outlet 9 from the conditioning drawer 4 to the compartment of the individual component 2, which fan is controlled by way of the control system, in accordance with the desired working temperature of the individual components. However, individual components 2 can also be equipped with an additional conditioning block 15 of their own, if their temperature sensitivity requires this. The control system of the measurement device then controls not only the additional conditioning block 15 of the individual component 2 but also the other devices for conditioning the air in the measurement device as a function of the signal of the temperature sensors 13 of the individual components 2 that are present.

The air inlet 5 can be designed for connecting a line for conditioned air, by way of which line an external source for conditioned air, preferably from the air conditioning system of the vehicle, i.e., from the passenger compartment or the cabin, can be connected.

The control system preferably contains at least one predetermined sequence in which a minimum and/or maximum temperature that can be predetermined is monitored for at least one of the individual components 2. This individual component 2 is only turned on when the minimum temperature is reached and/or exceeded or the maximum temperature is not exceeded.

Alternatively, also only the conditioning unit 7 and the at least one fan 6 in the conditioning drawer 4 could be put into operation until a minimum temperature is reached or exceeded or after the maximum temperature is exceeded.

A variant of the invention according to which a sequence for temperature-critical components 2 is integrated into the control system, according to which sequence temperature changes in the region of the individual components 2 are reduced by means of sliding or stepped raising or lowering of the fan throughputs, is also particularly advantageous.

For operation of the measurement device of FIG. 1 at particularly low temperatures of −30° C. to +5° C., for example, the free cross-section of air inlet 5 and air outlet 10 is reduced, preferably manually, but also automatically by way of the control system, as a function of the ambient temperatures to be expected. This is symbolized with the small arrows at air inlet 5 and air outlet 10. The energy demand of the measurement device is reduced with the circulating air function that results from this, and warm-up is accelerated. The free cross-section for incoming and outgoing air that still remains ensures the required air exchange for reduction of the internal air moisture. Also, fast warm-up of the measurement device can be accelerated by means of an optionally heatable insulation hood 16 or an external housing 16.

While only the fan 6 of the conditioning drawer 4 is in operation at first during warm-up and de-icing, the individual components 2 are turned on as soon as it has been guaranteed that they are free of ice and at their operating temperature. From this time on, the waste heat of the turned-on components 2 yields an additional heat input. The conditioning block 7 and any additional individual component conditioning blocks 15, whose temperatures are determined by way of temperature sensor 8 and 13, are in operation until a temperature limit that can be predetermined has been reached.

Figure 2:
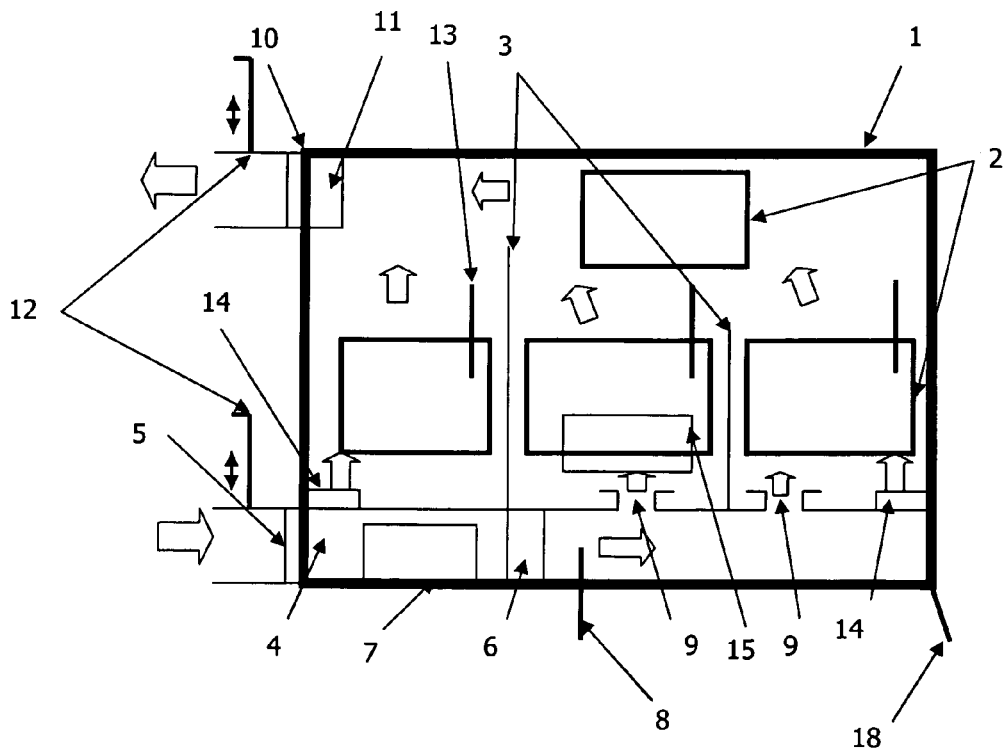
FIG. 2 represents the measurement device of FIG. 1 in a configuration for somewhat higher ambient temperatures.

During operation of the measurement device in the temperature range between 20 and 45° C., the cross-sections of air inlet 5 and air outlet 10 are completely open—symbolized in FIG. 2 by the thick arrows at air inlet 5 and air outlet 10—and the fresh air throughput amount is determined solely by the installed fans, i.e., the circulating air function is thereby reduced or completely out of operation. An insulation hood 16 that might be present can be removed or left out right from the start, since the fan throughputs ensure targeted cooling, as a function of the measured component temperatures. Starting from a temperature, which can be predetermined, at the temperature sensor 8, the conditioning block 7 or its heating device is turned off. The waste heat of all the components 2, together with the corresponding cooling air amounts, ensures suitable tempering in the device. If, however, the temperature, which can be predetermined, at the temperature sensor 8 is not reached, the conditioning block 7 also becomes active again. In the case that component-specific temperature limit values are exceeded or not reached, the air throughput amount is increased or reduced as necessary by way of control of the fans. In the case of low ambient temperatures, automatic reduction of the cross-section of the air inlet 5 and/or air outlet 10, brought about by way of the control system, can be provided also during measurement operation. In this way, an increase in the circulating air amount is achieved, with the advantages already described.

Figure 3:
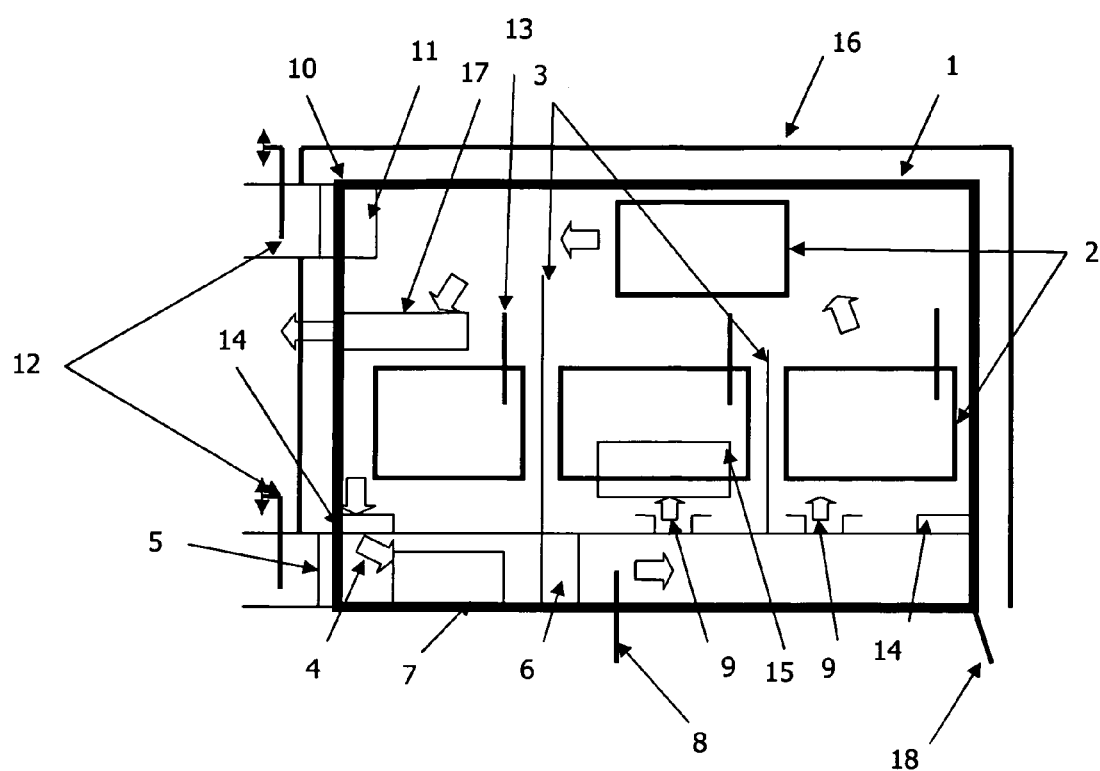
FIG. 3 shows an alternative embodiment for use at very high ambient temperatures.

For measurement tasks at particularly high ambient temperatures, at temperatures typically higher than 40° C., it is possible, as shown in FIG. 3, to dispose at least one further cooling block 17 in the housing, in addition to the insulation hood that is preferably in use again, or the external housing 16, and a conditioning block 7 that works as a cooling device. This cooling block 17 can be installed into a measurement device of FIG. 1 or 2 during the setup phase, for example.

The free cross-section of the of air inlet 5 and air outlet 10 is again adapted manually, possibly also automatically by way of the control system, preferably in the setup phase, as a function of the ambient temperature to be expected and/or the available cold air amount from external sources.

When an external air conditioning device is connected, or if the air is being supplied from a cooled region of the vehicle, the cross-sections are also partly closed, if necessary. The energy demand is reduced with the resulting circulating air function, and cooling is accelerated.

During cooling, only the one or every fan 6 in the conditioning drawer 4 is in operation to guarantee the circulating air function.

The conditioning blocks 7 and 15 or the additional cooling block 17 are preferably also connected with the control system of the measurement device; during cooling, they work until the temperature limit determined by the temperature sensor 8 and 13, in each instance, is reached or fallen short of, and are put into operation again as soon as defined temperature limits are exceeded.

The condensed water that occurs can be passed off by way of a drainage connection 18.

In the case of outside temperature changes such as those that can occur when driving through a tunnel, due to weather-related temperature changes, or when driving uphill and downhill, regulated fan throughput amounts, together with the additional heating/cooling that might be necessary, by means of heaters/coolers, ensure very slow and slight temperature changes in the surroundings of the components, and thus ensure stable measurement operation.

To ensure that the temperature changes that are reduced by means of the above measures cannot influence individual components 2 directly, the latter are insulated and/or equipped with a housing that has its own climate control. This "individual component mini-climate" additionally reduces the temperature variations that are caused by the cooling air flow.

The invention claimed is:

1. A mobile measurement device having individual components (2) that might have different working temperatures, disposed in a common housing (1), as well as having at least one fan (6), characterized in that the housing (1) is structured essentially in gastight manner, has compartments for the individual components (2) that are separated from one another by means of air baffles (3), and has a conditioning drawer (4) that extends over an entire housing side, which conditioning drawer (4) is provided with the single air inlet (5) and in which at least one fan (6), at least one conditioning block (7), and at least one temperature sensor (8) are disposed, where outlets (9) having a cross-section that is manually adjustable or automatically regulated by the control system lead from the conditioning drawer (4) to at least some compartments for the individual components (2), and where the conditioning block (7), the fan (6), and the temperature sensor (8) are connected with a control system integrated into the measurement device, which system controls the conditioning block (7) and the fan (6) in accordance with the desired working temperature of the individual components (2).

2. The measurement device according to claim 1, including a single air outlet (10) out of the housing (1).

3. The measurement device according to claim 2, wherein the air outlet (10) includes a fan (11) which is connected with the control system integrated into the measurement device, and is controlled in accordance with the desired working temperature of the individual components (2) or of the measurement device.

4. The measurement device according to claim 1, wherein the cross-section of air inlet (5) and/or air outlet (10) is adjustable by way of the control system.

5. The measurement device according to claim 1, wherein at least some of the individual components (2) include a temperature sensor (13) that is connected with the control system integrated into the measurement device, and a fan (14) is used in an outlet (9) from the conditioning drawer (4) to the compartment of the individual component (2), which fan (14) is connected with the control system integrated into the measurement device and is controlled in accordance with the desired working temperature of the individual components (2).

6. The measurement device according to claim 1, wherein at least some of the individual components (2) include a temperature sensor (13) that is connected with the control system integrated into the measurement device, and at least one of the individual components (2) is provided with an additional conditioning block (15) that is also connected with the control system integrated into the measurement device and is controlled in accordance with the desired working temperature of the individual components (2) or of the measurement device.

7. The measurement device according to claim 1, wherein the air inlet (5) is designed for connecting a line for conditioned air.

8. The measurement device according to claim 1, wherein a sequence is implemented in the control system, according to which sequence a minimum and/or maximum temperature that can be predetermined is monitored for at least one of the individual components (2), and this component is only turned on or off, respectively, when the minimum temperature is reached and/or exceeded or the maximum temperature is not exceeded, respectively.

9. The measurement device according to claim 1, wherein a sequence is integrated into the control system according to which only the conditioning unit (7) and the at least one fan (6) in the conditioning drawer (4) can be put into operation until a minimum temperature is reached or exceeded or after the maximum temperature is exceeded.

10. The measurement device according to claim 1, wherein a sequence for temperature-critical components (2) is integrated into the control system according to which temperature changes are reduced by means of sliding or stepped raising or lowering of the fan throughputs.

* * * * *